United States Patent [19]

Ellis

[11] 4,263,085

[45] Apr. 21, 1981

[54] TAPE PRODUCT FOR FORMING INDICIA, AND PROCESS AND APPARATUS FOR PRODUCING SAME, AND PRODUCTS PRODUCED USING SUCH TAPE PRODUCT

[76] Inventor: Jon P. Ellis, 14790 Inkster Rd., Redford, Mich. 48239

[21] Appl. No.: 13,210

[22] Filed: Feb. 21, 1979

Related U.S. Application Data

[63] Continuation-in-part of Ser. No. 919,329, Jun. 26, 1978.

[51] Int. Cl.³ .............................................. B44C 1/22
[52] U.S. Cl. .................................. 156/542; 156/235; 156/249; 156/660
[58] Field of Search ................................ 156/540–542, 156/235, 238, 249, 631, 659.1, 660

[56] References Cited

U.S. PATENT DOCUMENTS

| | | | |
|---|---|---|---|
| 2,441,164 | 5/1948 | Miller | 156/542 X |
| 3,887,420 | 6/1975 | Weingrad | 156/235 |
| 3,979,247 | 9/1976 | Berg | 156/235 X |
| 3,985,602 | 10/1976 | Stuart | 156/235 |

*Primary Examiner*—William A. Powell
*Attorney, Agent, or Firm*—Irving M. Weiner; Pamela S. Burt; John L. Shortley

[57] ABSTRACT

A machine and process for forming indicia in or on the surface of objects, particularly friable or hyaline objects, such as glass and ceramics, by producing tape carrying indicia-forming masks, and for applying those masks to the articles to be engraved at a rapid rate, for relatively high volume applications, is disclosed. A die is formed by chemical etching, and is heated to cut an adhesive-backed thermoplastic film on a carrier tape. The masks and the cutout portions are separated, so that both positive and negative masks are produced simultaneously, and either can be applied automatically to objects to be etched and/or embossed. Embossing and/or etching is performed by sandblasting, chemical etching, or selective application of coating materials.

1 Claim, 17 Drawing Figures

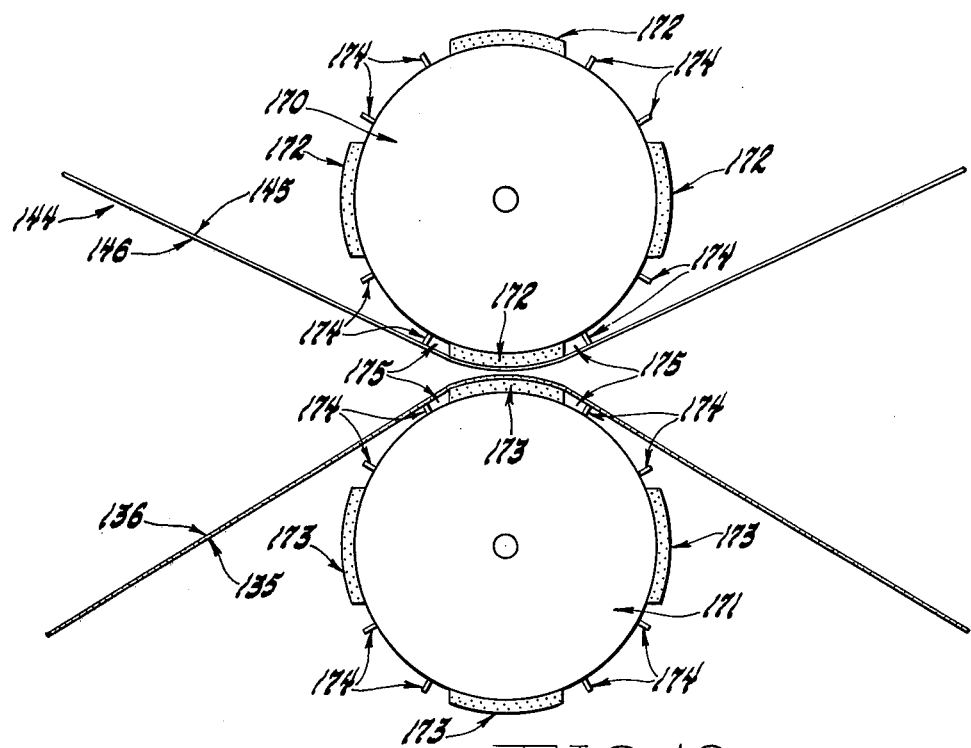
FIG.16
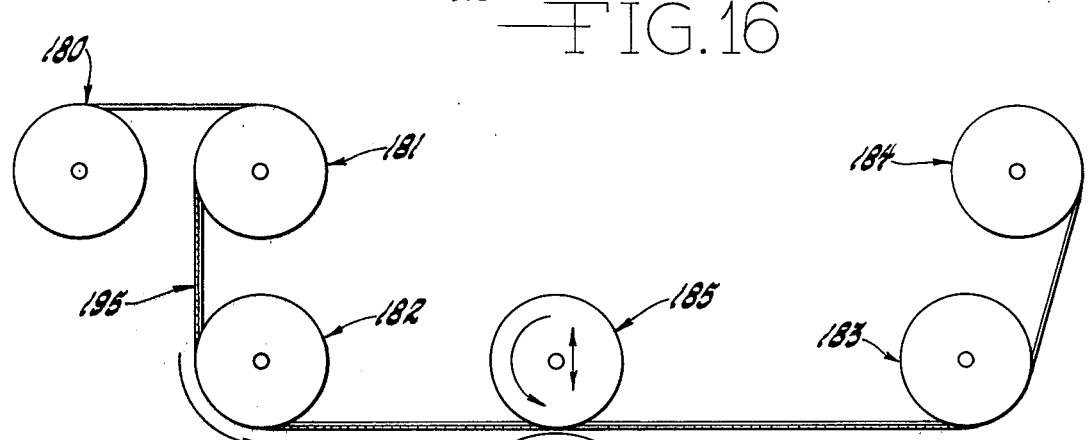
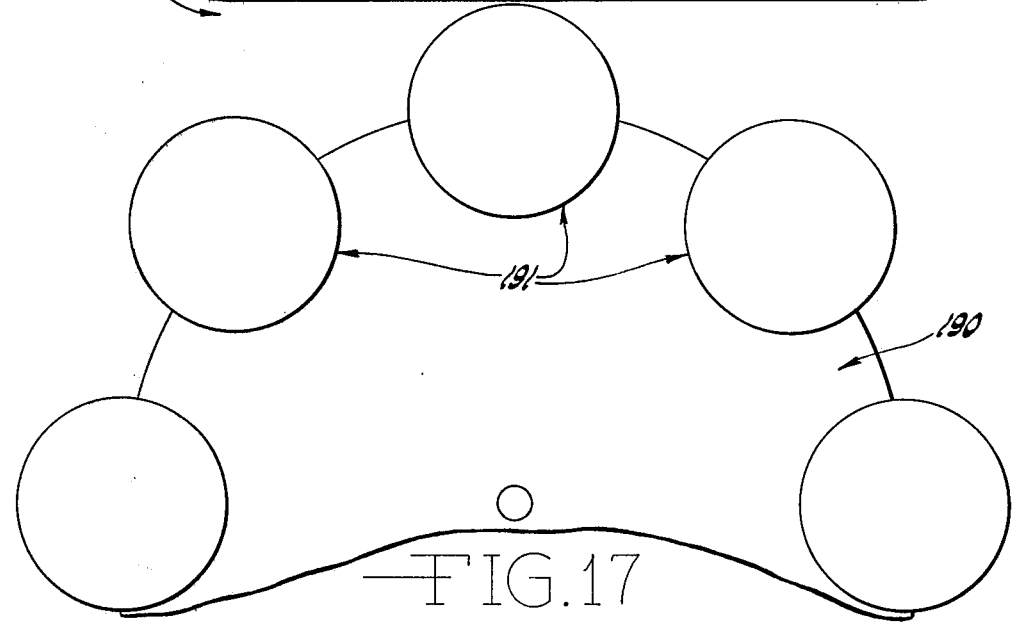
FIG.17

TAPE PRODUCT FOR FORMING INDICIA, AND PROCESS AND APPARATUS FOR PRODUCING SAME, AND PRODUCTS PRODUCED USING SUCH TAPE PRODUCT

This application is a continuation-in-part of U.S. Pat. Application Ser. No. 919,329, filed June 26, 1978.

The present invention relates generally to apparatus for forming indicia outline elements to serve as indicia-forming masks, and to apparatus for applying indicia-forming masks to articles for forming indicia therein.

BACKGROUND OF THE INVENTION

There have been many attempts to provide a useful process for engraving and/or embossing of glass and ceramic articles.

U.S. Pat. No. 2,065,406, issued in 1936 to Silverman, entitled "ORNAMENTED GLASS AND METHOD OF PRODUCING SAME", discloses a method of producing a bas-relief visual effect by engraving the painted reverse surface of a glass plate, and forcing metal foil into the engraved area.

U.S. Pat. No. 2,555,007, issued in 1951 to Fuller, Jr., entitled "METHOD OF FORMING DESIGNS IN RELIEF", discloses a method of forming designs in relief to produce a multi-color design by selective sandblasting of a plate laminated from layers of glass.

U.S. Pat. No. 3,267,621, issued in 1966 to Meyers et al, entitled, "ARTICLE DECORATING", discloses a method of decorating glassware by using a machine, designed for applying silkscreened painted decorations, to apply an etching mask.

U.S. Pat. No. 3,328,925, issued in 1967 to Hewitt, entitled "PROCESS FOR ORNAMENTING GLASS ARTICLES", discloses a method of producing three-dimensional designs on glass using a sandblasting machine with a conveyor system, and a precut shield, prefabricated shields, or injection-molded mask.

The prior art does not solve the problems of engraving and/or embossing curved or irregular glassware or ceramics. Furthermore, the prior art techniques mentioned above, are too complex and expensive.

Other known prior art involves the use of precut masks of various materials to be applied to the surface of glassware. These precut masks are unsatisfactory on contoured surfaces and do not conform to the surface to protect those areas not to be engraved. This results in irregular and blurred engraving, and will not allow engraving of fine details. The instant invention discloses a method of making and using precut masks which overcomes these difficulties.

Another known method involves the use of a precut rubber mask, used for engraving letters and symbols in varying combinations. These rubber masks may initially conform to a contoured surface, but lose their resiliency, and flutter against the surface, resulting in blurred detail. This type of mask is also unsuitable for engraving narrow lines and fine detail.

SUMMARY OF THE INVENTION

It is a principal object of this invention to provide a machine and process of engraving or embossing indicia into and/or on the surface of glassware and ceramics of simple or complex curvature in a manner which is suitable for use where either a small number or a large number of objects are to be so engraved or embossed.

Another object of this invention is to provide a machine and process of engraving or embossing indicia into and/or on the surface of glassware and ceramics of simple or complex curvature which is simple in nature and economical.

It is a further object of this invention to provide a machine and process of forming indicia having fine detail and narrow lines in their format.

In accordance with a first embodiment of the invention, a dip coating or a thermoplastic conformal coating or a piece of adhesive-backed vinyl or other thermoplastic material is applied to the area of the object to be engraved, embossed, and/or protected. The object is clamped into a special novel machine. A heated stylus moves about the surface of the object while a tracing stylus is manually guided over flat template, cutting the thermoplastic material in the desired pattern. The areas of the thermoplastic mask corresponding to areas to be engraved are removed, and the engraving or embossing is performed by blasting with finely-divided abrasive particles or by use of chemical coatings.

In a second, preferred embodiment, in accordance with the instant invention, a heated die of novel manufacture is used to repetitively cut a moving adhesive-backed thermoplastic tape in the form of indicia-outline element masks. The cut out portions are removed with a transfer tape, which can be used to emplace negative masks for engraving and/or embossing wherein the area surrounding the desired indicia is etched. The remainder of the vinyl tape is separated from the carrier tape with another transfer tape, forming conventional positive indicia-outline masks.

Either transfer tape can be used directly to apply masks directly, or tapes can be premanufactured as a sandwich assembly of indicia-outline element masks between a carrier tape and an adhesive transfer tape, for later separation and use.

A novel machine accepts either transfer tapes or premanufactured sandwich tapes, and automatically applies the indicia-outline element masks to articles retained in an indexing carrousel.

The engraving and/or embossing is then performed by blasting with finely-divided abrasive particles, or by selectively applying a chemical etchant, or by applying a chemical coating.

BRIEF DESCRIPTION OF THE DRAWINGS

FIG. 16 is a side perspective view of an alternate embodiment of a device for separating the indicia-outline element masks according to the second embodiment of the invention.

FIG. 17 is a side perspective view of a device, according to the second embodiment of the invention to apply indicia-outline element objects to be etched, embossed or coated.

DETAILED DESCRIPTION

Figure 1:
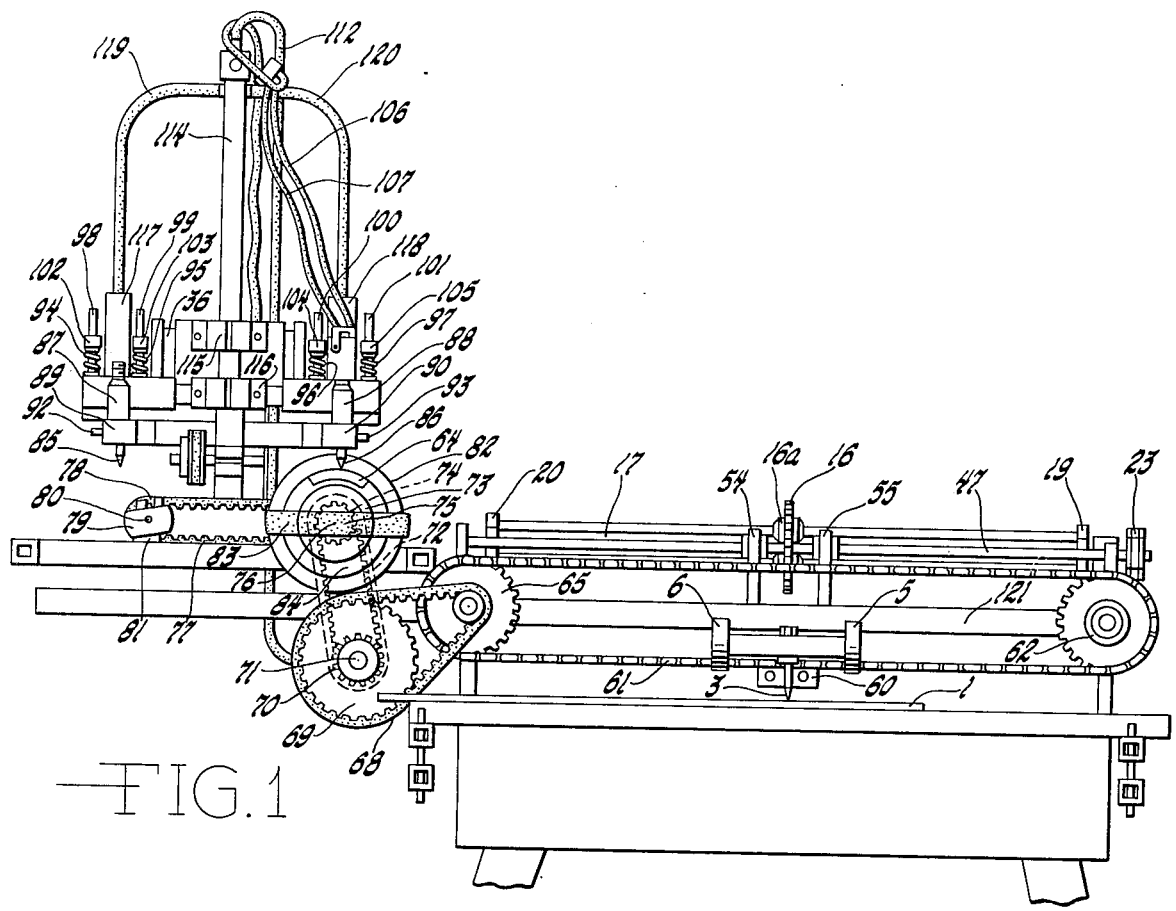
FIG. 1 is a schematic vertical elevational view of a first embodiment of the invention.
Figure 2:
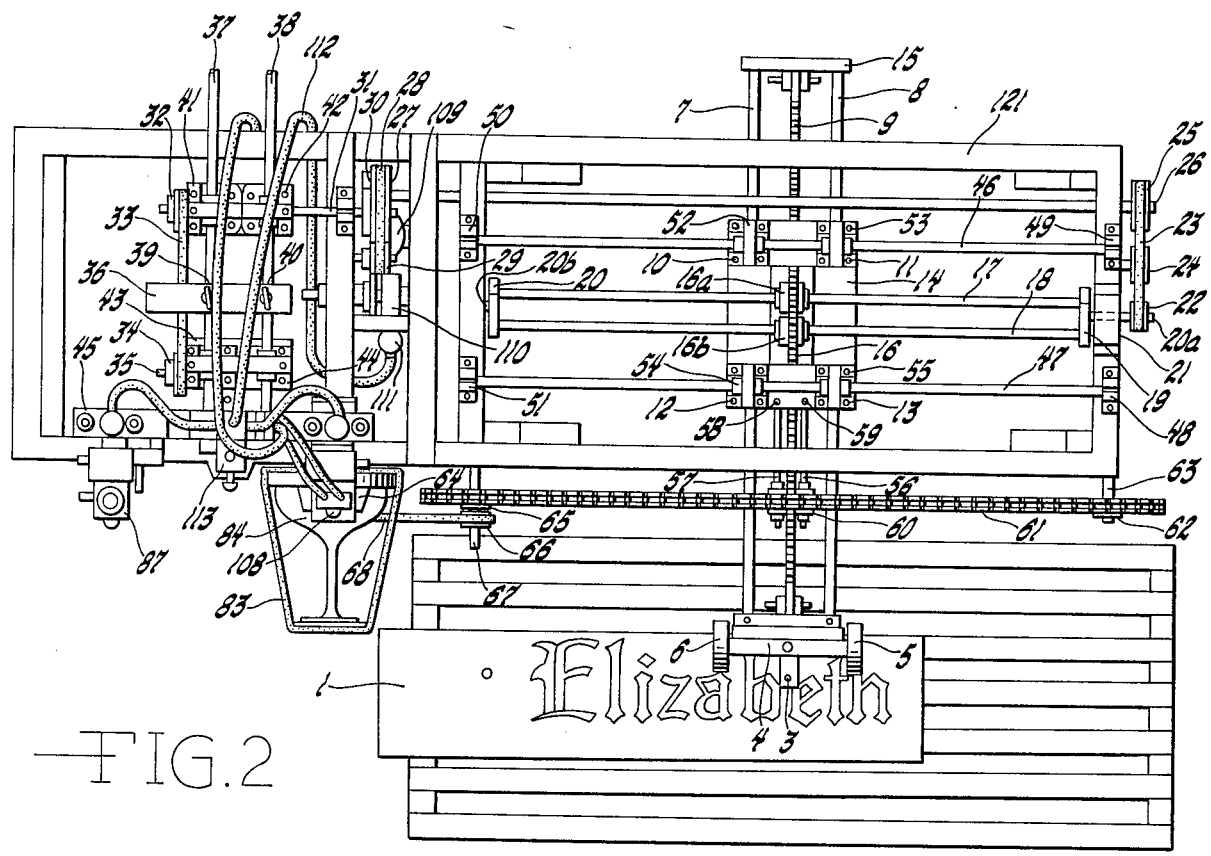
FIG. 2 is a top plan view of the FIG. 1 embodiment.

In the embodiment illustrated in FIGS. 1 and 2, which is configured for use in the engraving or embossing of indicia into and/or on the surface of curved objects, either cylindrical or irregularly contoured, the operation is as follows:

The operator holds handles 5 and 6 to guide tracing stylus 3 over the surface of template 1. For simplicity, one direction of motion will be discussed at a time. As the operator guides stylus 3 in an upstroke on a letter on template 1, stylus support 4 moves in a corresponding direction, and causes rods 7, 8 and rack 9 to move. Rods 7 and 8 are slidably supported by pillow blocks 10, 11, 12, 13 on the lowermost side of plate 14, and rigidly retained by block 15.

Rack 9 is rigidly fastened to support 4 and block 15. The teeth of rack 9 mesh with the teeth of gear 16 and cause gear 16 to rotate. Rods 17 and 18 which are slidably attached to gear 16 through bushings 16a and 16b in the face of gear 16 on a diameter of said gear, are rigidly attached to bars 19, 20, and cause bars 19, 20 and shafts 20a and 20b, shaft 20b being rotatably mounted in a hole (not shown) in frame 121, to rotate. Movement of bars 19 causes shaft 20a, rotatably mounted through pillow block 21 and sheave 22, to rotate, causing movement of belt 23. Movement of belt 23 causes rotation of idler sheave 24 and sheave 25, which is fastened to shaft 26. Rotation of shaft 26 causes rotation of sheave 27. Rotation of sheave 27 causes movement of belt 28, and rotation of idler sheave 29 and sheave 30, which is attached to shaft 31. Rotation of shaft 31 causes rotation of sheave 32, and movement of belt 33.

The opposite end of belt 33 is supported on sheave 34, which is fastened to shaft 35, which in turn is rotatably fastened through a pillow block (not shown). L-shaped bar 36 is clamped by a clamping device (not shown) to the lowermost portion of belt 33. Bar 36 is adjustably fastened to rods 37, and 38 which pass through holes 39, 40 in bar 36. Rods 37, 38 are slidably mounted through pillow blocks 41, 42, 43 and 44 and fastened to cutting head baseplate 45, causing it to move.

Rotation of object 84 is a result of lateral motion of tracing stylus 3. Movement of stylus 3 in a lateral direction causes lateral motion of rods 7 and 8 which are slidably supported by rods 46 and 47, which are securely fastened into clamp blocks 48, 49, 50 and 51, which are in turn atttached to frame 121. Rods 46 and 47 pass through pillow blocks 52, 53, 54, and 55, which are fastened to plate 14.

Lateral movement of rods 7 and 8 causes lateral movement of plate 14, and of rods 56 and 57 which are fastened into plate 14 and retained by screws 58 and 59. Rods 56 and 57 are attached to clamp 60, which is firmly attached to the lowermost portion of belt 61. Movement of belt 61 causes rotation of support sheave 62 about shaft 63, and rotation of sheave 64 and sheaves 65 and 66 about shaft 67. Rotation of sheave 66 imparts movement to belt 68, which in turn causes rotation of sheaves 69 and 70 about shaft 71. Rotation of sheave 70 imparts motion to belt 72 which in turn causes rotation of sheaves 73 and 74 and plate 75 on shaft 76, which is rotatably supported in a pillow block (not shown). Rotation of sheave 74 causes motion of belt 77 and rotation of sheave 78 and plate 79, on shaft 80, which is rotatably supported in pillow block 81. Disk 82 is attached to plate 75. Elastic band 83 retains object 84.

The cutting head assembly is composed of cutting head baseplate 45 and items 85 through 120. Cutting styli 85 and 86 are attached to heating elements 87 and 88, which are retained in blocks 89 and 90. Mounting blocks 90 and 91 are attached to baseplate 45, and pivot shafts 92 and 93 are attached to blocks 90 and 91. Blocks 89 and 90 are rotatably fastened to pivot shafts 92 and 93.

Springs 94, 95, 96, and 97 are securely fastened to baseplate 45 at their lowermost end and adjustably fastened to rods 98, 99, 100, and 101 by collars 102, 103, 104 and 105. Rods 99-101 serve to limit the downward travel of styli 85 and 86 by contacting the rearmost portion of block 90 and 91, and serve to adjust the range of vertical movement of stylus 85 and 86. Power is supplied to heating elements 87 and 88, through wires 106 and 107 and socket 108 (typical). Control means for electric power are not shown. In the embodiment illustrated, pressurized air at a constant pressure is supplied to a foot-actuated control (not shown) through filter 109, regulator 110, valve 111, line 112 to a manifold block 113 which is supported by rod 114, held to baseplate 45 by clamp blocks 115 and 116. The manifold block 113 distributes air to cylinders 117 and 118 through tubes 119 and 120. By means of this arrangement, the stylus can be lifted from the object 84 at appropriate times by a foot-operated valve or other known means.

In the device described above, linear motion of the tracing stylus is converted to motion of the cutting stylus or object in two separate rotary motion steps so that the size relations between the template and the indicia-outline element mask may be easily varied. In the example above, the relative diameters of sheaves 22 and 25, or 27 and 30 determines vertical proportioning, and the diameters of sheaves 66 and 69 perform this function for horizontal proportioning.

Figure 3:
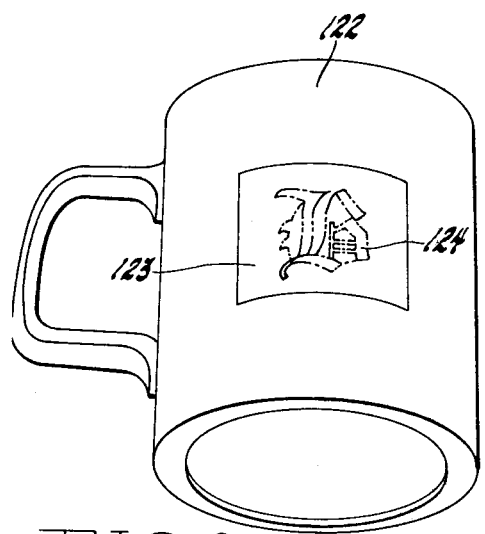
FIGS. 3 through 8 are sequential perspective views of a product as produced in accordance with one possible embodiment of the present invention.
Figure 4:
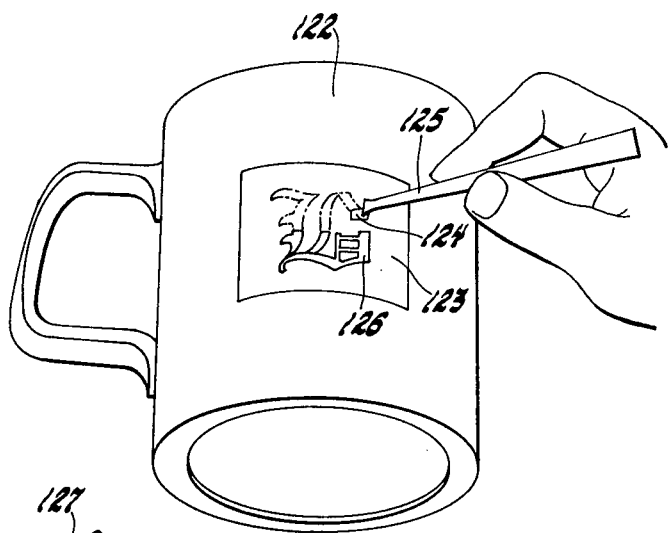
Figure 5:
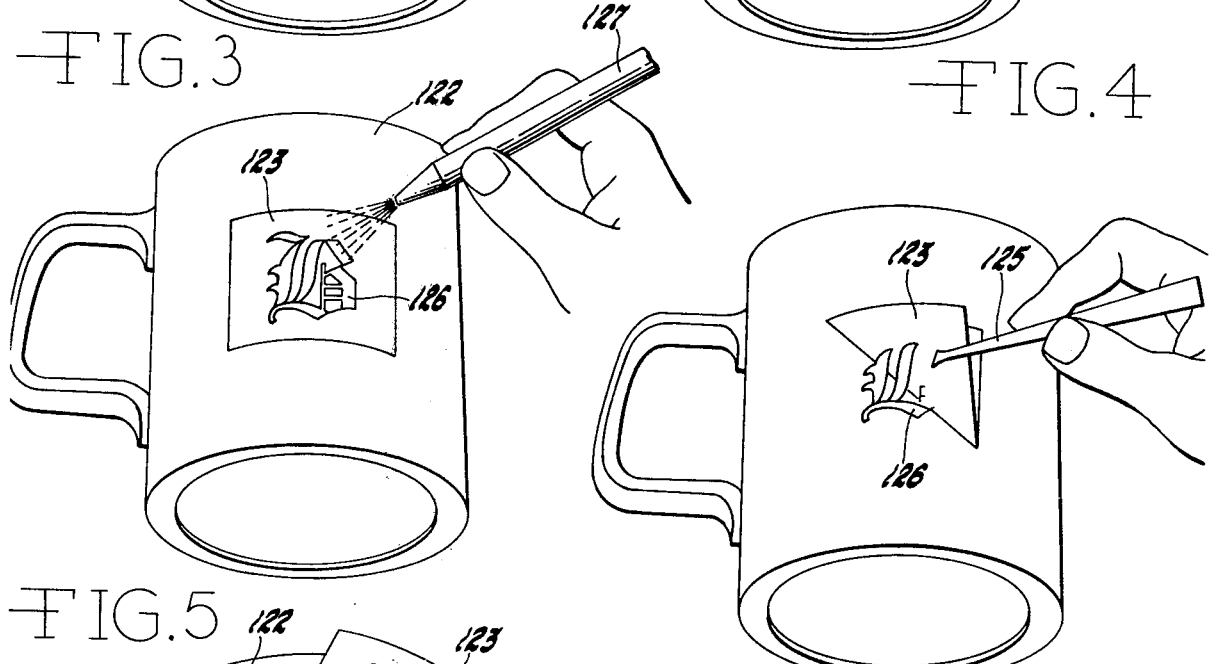
Figure 6:
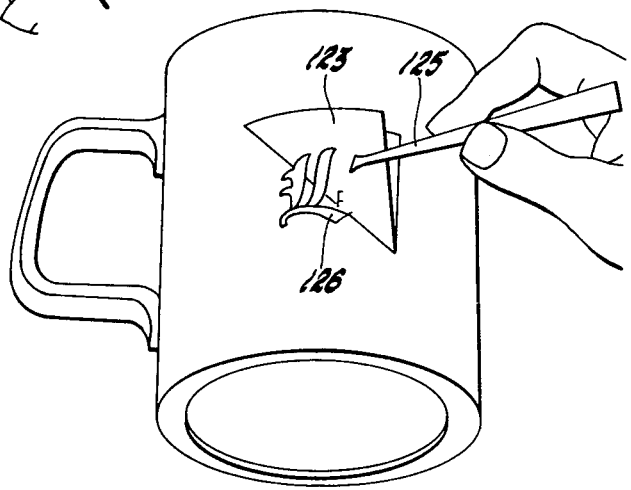
Figure 7:
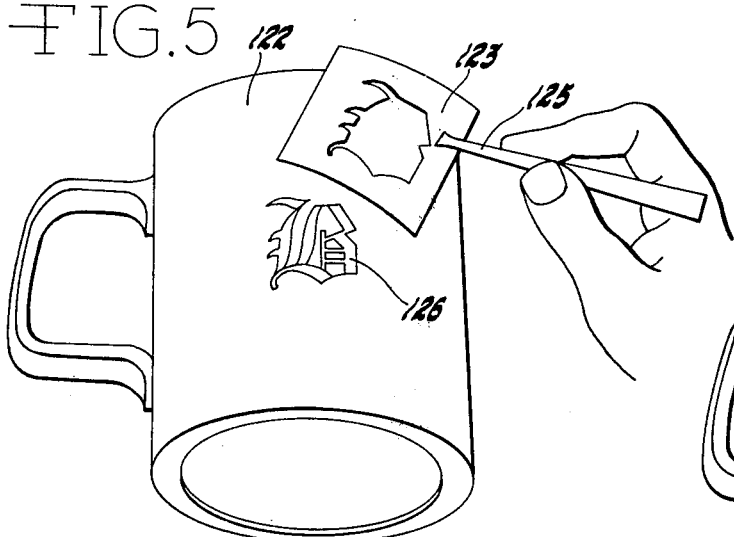
Figure 8:
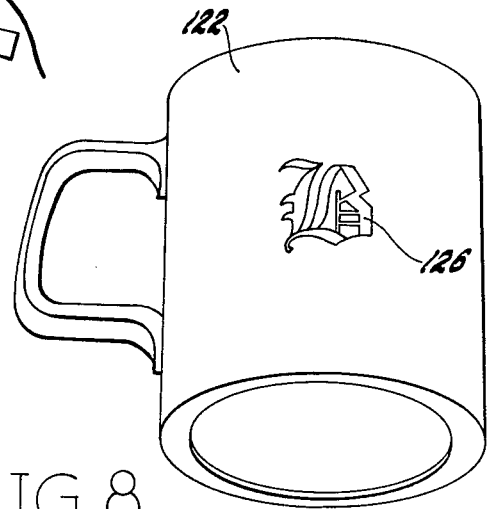

FIG. 3 shows a object 122 and a completed indicia-outline element mask 123. Since the same items, in sequential stages are shown in FIGS. 3–8, similar numbering will be used whenever possible. In FIG. 3, area 124 of indicia-outline mask 123 is to be removed to unmask the area to be engraved and/or embossed. In FIG. 4, tweezers 125 are used to remove mask area 124, exposing engraving area 126 in FIG. 5. Sandblasting nozzle 127 is used to spray abrasive grit against area 126, with areas not to be engraved and/or embossed protected by the remainder of indicia-outline mask 123. In FIGS. 6 and 7, indicia outline element mask 123 is being removed from object 122 with tweezers 125. FIG. 8 shows the completed object.

Indicia-outline element mask 123, in one preferred embodiment, is formed by dipping an object 122 or 84 into a coating material, which is allowed to dry before being retained to disk 82 by band 83, cut by stylus 85 or 86, and processed as shown in FIGS. 3-8. A suitable coating material is a product available from Seal-Peal Inc, located in Troy, Michigan, as Seal Glo 434-T mixed with 1-6% castor oil. The chemical composition of this material is 38% xylene, 40% methyl ethyl ketone, 2.5% dioctyl phthalate, and 19.5% polyvinyl chloride resin.

It is to be understood that the shape of the object 122 in FIGS. 3-8 was chosen for convenience of illustration only, and is not intended as a limitation of the object shapes that can be engraved and/or embossed using this invention.

Figures 9, 10, 11:
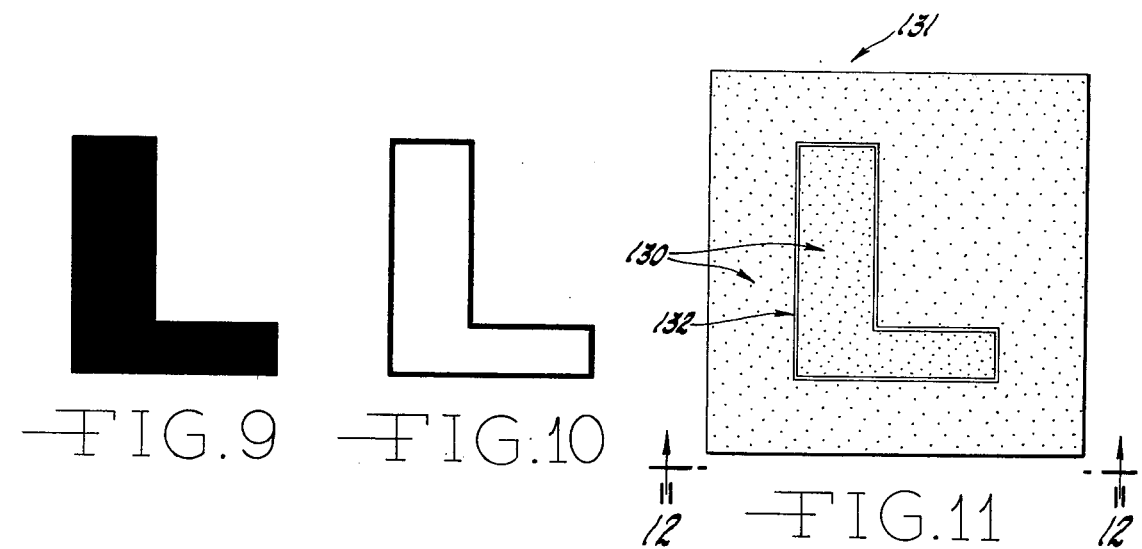
FIG. 9 is a view of an indicia element to be used in accordance with a second, preferred embodiment of the invention.
FIG. 10 is a view of the pattern necessary to produce the indicia element of FIG. 9.
FIG. 11 is a view of a die produced in accordance with the second embodiment of the invention.
Figure 12:
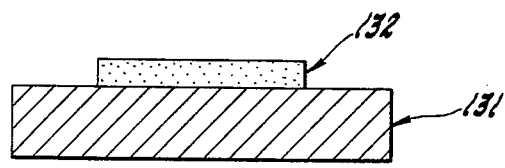
FIG. 12 is a horizontal perspective view of a die produced in accordance with the second embodiment of the invention.

FIG. 9 is an illustration of indicia to be engraved and/or embossed according to a second embodiment of the invention.

FIG. 10 is an outline of FIG. 9, showing the shape of the cutting edges to be formed on a die, and the pattern of chemically resistant material that must be applied to, or remain on, the surface of a die blank.

In the preferred embodiment, the chemically resistant material is a conventional light-sensitive coating, as is used for the making of printing plates. The die may be made from a commerically available pre-coated zinc printing plate blank.

FIG. 11 shows a finished die, after the chemically-resistant material has been applied in a predetermined pattern, and the die has been chemically etched to remove areas 130 from die 131, to a depth of approximately 1/16 inch (1.6 mm), leaving a cutting edge 132 in the outline of the indicia to be formed. In this regard, it should be noted that photographic techniques are preferably used to make any dies useable with the instant invention, such as by preparing indicia outline element forming dies from oversized artwork.

Figure 13:
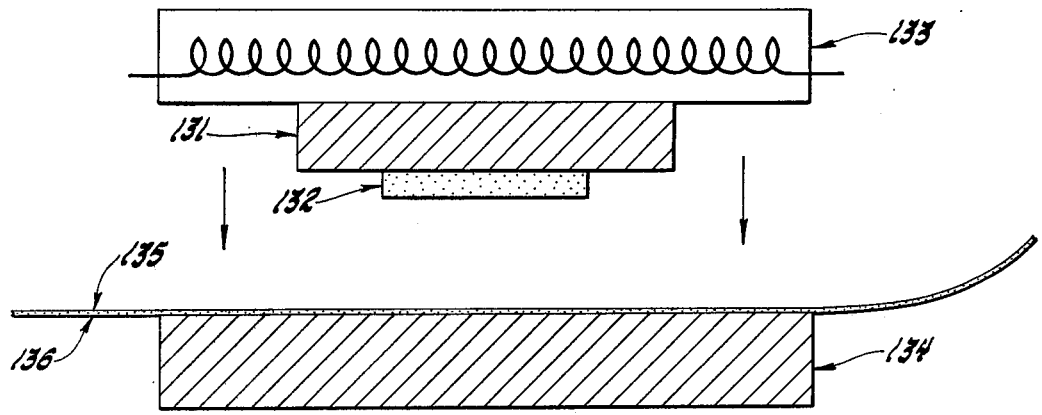
FIG. 13 is a horizontal perspective view of a die according to the second embodiment of the invention, mounted on a heater.

FIG. 13 shows die 131 mounted to heating element 133, in position over press bed 134. Die 131 is pressed by conventional means, such as air cylinders, into commercially available adhesive-backed thermoplastic film 135, on heavy paper carrier tape 136, to cut the indicia outline element in synchronism with separating dies to be described later. It is useful, although not an absolute necessity, to provide heating element 133 with knife edges to form separable indicia-outline element masks, and punches for holes to facilitate synchronization of the elements of this invention by conventional means, such as photodetector devices controlling high speed clutches.

Figure 14:
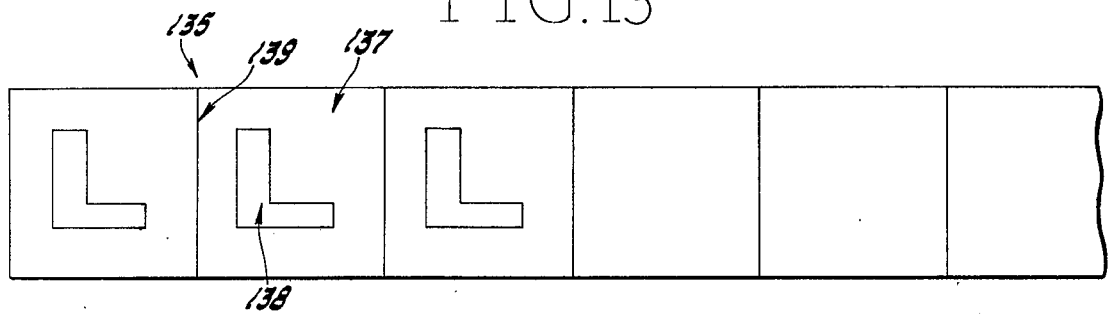
FIG. 14 is a top perspective view of a plurality of discrete indicia-outline element masks in tape form produced in accordance with the second embodiment of the instant invention.

FIG. 14 shows a typical thermoplastic film tape 135 after being cut by die 131 into areas 137 and 138, with frame edge lines 139.

Pinch rollers 157 and 158 intermittently draw carrier tape 136 between dies 131 and press bed 134, and between separating dies 140 and 141. Upper die 142 has a raised portion corresponding in size and shape to area 138 on the thermoplastic film. Die 142 may be mechanically machined to this configuration, or may be produced in the same manner as die 131, as described above, Dies 140 and 141 are provided with gates 142. A source of vacuum is introduced into areas 143 in a conventional manner, to hold tape in position on the die faces.

Transfer tape 44, similar in characteristics to conventional masking tape, wound adhesive-side outward, having thin paper side 145 and adhesive side 146, is pulled from roll 150 by pinch rollers 155 and 156, in synchronism with pinch rollers 8 and 9.

The dies are closed by conventional means, such as air cylinders. The lower die 141 is preferably, but not necessarily stationary.

When the dies 140 and 141 are cloesd, in the embodiment shown, adhesive side 146 of the transfer tape will be forced against cut out area 138, and will adhere to it. When the dies are opened, area 138 of adhesive-backed thermoplastic film 135 will be removed from the carrier tape 136, and will adhere to surface 146 of tape 144, with the adhesive side of area 138 facing outward.

In order to make use of areas 138 as "negative" indicia forming masks, and areas 137 as conventional or "positive" indicia forming masks, a tape "sandwich" is fabricated with each type of indicia forming mask. Pinch rollers 157 and 158, which pull carrier tape 135 and areas 137 of film 137 between dies 140 and 141, also apply transfer tape 147, similar to tape 144, having adhesive side 148 and paper backing 149, to the non-adhesive surfaces of areas 137 of thermoplastic film 135, and carrier tape 136. Transfer tape 147 is supplied by roll 154, and the completed "sandwich" tape 160 is collected on reel 153.

In the illustrated embodiment, should tape 160 be separated, thermoplastic film areas 137 would be attached to transfer tape 147, with the adhesive side of the thermoplastic film facing outward.

In order to make use of the "negative" indicia forming masks, areas 138 of film 135, carrier tape 161, identical to carrier tape 136, is supplied from roll 152, and applied as a protective covering by pinch rollers 155 and 156. The tape 162 thus produced can be spooled on take up reel 151.

FIG. 16 illustrates an alternate embodiment of separating dies 140 and 141. Roll 170 is provided with several dies 172, which are similar to die 140, except being curved to fit roll 170. Roll 171 is provided with dies 173, each similar to die 141, except curved to fit roll 171. Gates 174 are provided on both rolls 170 and 171, forming spaces 175, when a tape is in place. A vacuum source is introduced into areas 175, by conventional means including a conventional rotary coupling, to hold transfer tape 144, and carrier tape 136 with thermoplastic film 135 in position. The rotation of rolls 170 and 171 is synchronized with the rotation of pinch rollers 155, 156, 157 and 158 using conventional means.

It should be noted that tape 144, with film areas 138 adhered to it, could be directly used, rather than being covered with carrier tape and collected on take up reel 151, or that tape 160 could be directly used, and not collected on take up reel 153.

FIG. 17 shows a device for automatically applying indicia forming masks to objects to be engraved and/or embossed. It is illustrated in stand-alone configuration for clarity, although in the preferred embodiment of this invention. Tape 160 of FIG. 15 can be guided to roll 181, rather than accumulated, or tape 135 could be guided to roll 182, rather than covered and accumulated.

Figure 15:
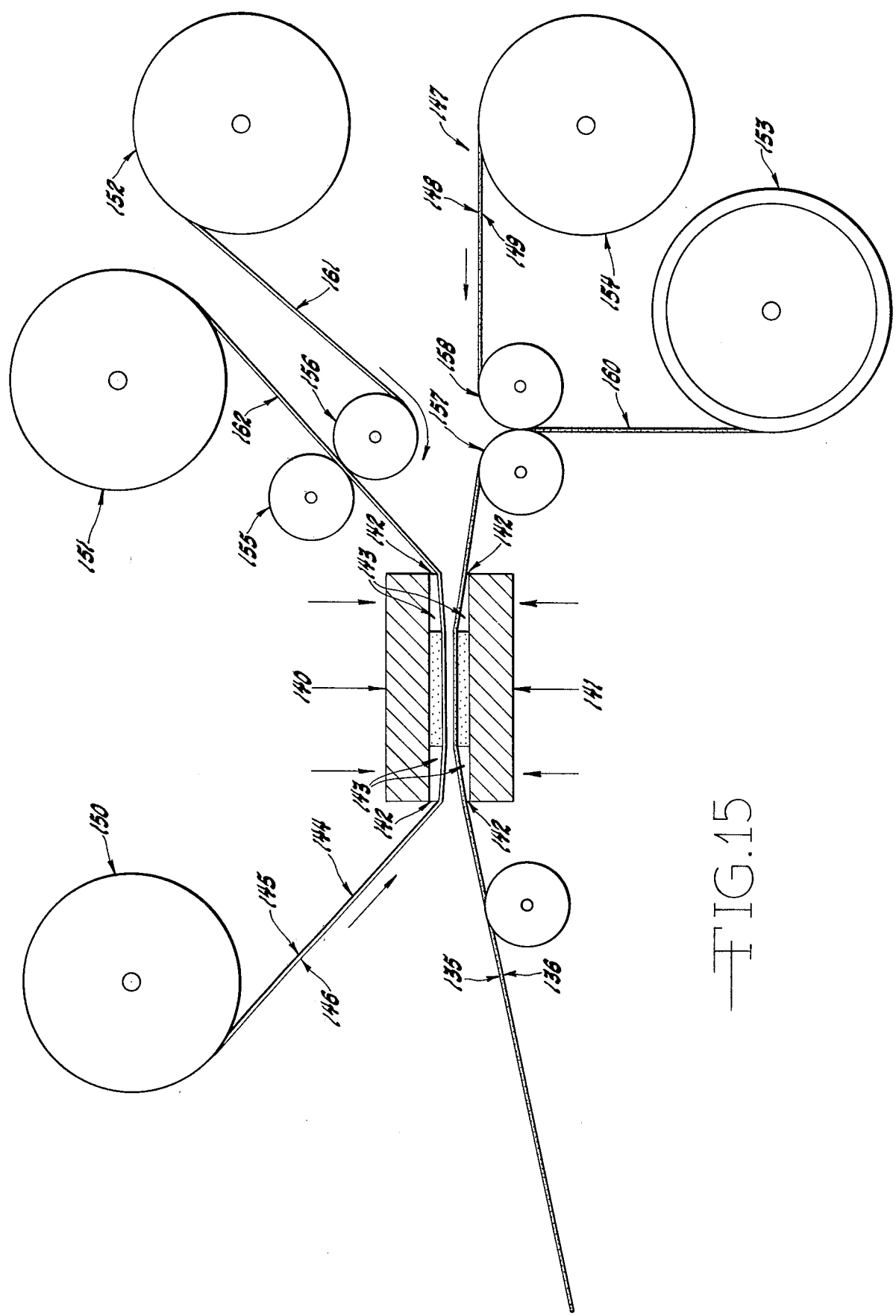
FIG. 15 is a side perspective view of a device for processing the tape shown in FIG. 13 into separate positive and negative indicia-outline element masks, according to the second embodiment of the invention.

In the embodiment illustrated, sandwich tape 160 or 162, as accumulated on take up reels 151 or 153 of FIG. 15, is transferred to roll 181. The sandwich is separated and the carrier tape is attached to take up reel 180. The separated transfer tape 195 with adhesive thermoplastic film areas 137 or 138 attached, is passed over rolls 182, 183, 185, and on to take up reel 184. The rotation of rolls 182, 183, and 185 are synchronized by conventional means. Reels 180 and 184 are rotated through conventional slip clutches.

Objects 191, such as glasses or mugs, are placed in a conventional carrousel 190, which rotates in synchronism with rolls 182, 183 and 185. Roll 185 is a resilient roll used to force the transfer tape 195 toward an object 191, and cause the thermoplastic film area 137 or 138 to adhere to an object 191, and separate from the transfer tape 195. It is desirable, but not an absolute necessity to practice the invention, that roll 185 be mounted to move towards and away from carrousel 190 at appropriate times. This can be accomplished in conventional ways, such as a cam or dogs on carrousel 190 intermittently engaging flexible drive or support means for roll 185.

The intent of this motion is to reduce the chance of an applied indicia forming mask separating from the object, and re-adhering to the transfer tape. If roll 185 forces tape 195 against an object 191, then withdraws, the tape 195 will be pulled evenly away from object 191, and forces which could cause separation will not be concentrated at one edge of the applied indicia forming mask, as it is with tangential separation of tape 195 from an object 191. Objects 191 are then removed from carrousel 190, and the indicia in engraved and/or embossed by blasting with finely-divided abrasive particles, by selectively applying chemical etchants, or by other known means, including painting and application of inks.

I claim:

1. An apparatus for applying indicia-forming masks to articles for forming indicia therein or thereon, comprising:
    means for supporting a roll of indicia-outline bearing tape including at least one carrier tape, at least one transfer tape, and a plurality of indicia outline elements disposed therebetween;
    said indicia outline elements having an adhesive surface to retain said outline elements to said carrier tape;
    said transfer tape having an adhesive surface in contact with a non-adhesive surface of said outline elements;
    means for separating said carrier tape from said indicia-outline bearing tape so that said transfer tape supports said indicia outline elements disposed adjacent said transfer tape;
    means for supporting a plurality of said articles;
    means for sequentially and synchronously positioning one of said articles and one of said indicia outline elements on said transfer tape in juxtaposition to each other; and
    means for pressing said transfer tape against said article so that said indicia outline element adheres to said article forming an indicia-forming mask thereon.

* * * * *